(12) United States Patent
Kawabe

(10) Patent No.: US 6,320,298 B1
(45) Date of Patent: Nov. 20, 2001

(54) ACTUATOR DRIVING CIRCUIT, AN ACTUATOR DRIVING DEVICE, AND AN ACTUATOR DRIVING METHOD

(75) Inventor: Koutaro Kawabe, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/365,876

(22) Filed: Aug. 3, 1999

(30) Foreign Application Priority Data

Aug. 3, 1998 (JP) .................................................. 10-219221

(51) Int. Cl.$^7$ .................................................. H01L 41/08
(52) U.S. Cl. ................ 310/317; 310/316.01; 310/316.02
(58) Field of Search ............... 310/317, 316.01, 310/316.02

(56) References Cited

U.S. PATENT DOCUMENTS

| | | | |
|---|---|---|---|
| 4,793,689 | * 12/1988 | Aoyagi et al. ................... | 310/317 X |
| 4,990,835 | * 2/1991 | Ohnishi et al. ...................... | 318/116 |
| 5,587,846 | * 12/1996 | Miyano et al. ................... | 310/317 X |
| 5,589,723 | 12/1996 | Yoshida et al. . | |
| 5,640,065 | * 6/1997 | Abe et al. ............................ | 310/317 |
| 5,917,267 | * 6/1999 | Miyazawa et al. ................... | 310/317 |
| 6,111,336 | * 8/2000 | Yoshida et al. ...................... | 310/328 |
| 6,140,750 | * 10/2000 | Ueyama ............................ | 310/317 X |

* cited by examiner

Primary Examiner—Mark O. Budd
(74) Attorney, Agent, or Firm—McDermott, Will & Emery

(57) ABSTRACT

An actuator driving circuit includes a drive pulse signal generator, a drive voltage generator for generating a drive voltage for drive pulse signal generation upon receipt of a power supplied from a power source. The drive pulse signal is generated so that the relationship between the frequency of power noise cyclically produced from the drive voltage generator and imposed on the drive voltage and the frequency of the drive pulse signal satisfies the following equation:

$$4000 < |m \cdot f1 - n \cdot f2|$$

wherein
m: positive integer below a specified value;
n: positive integer below a specified value;
f1: frequency of power noise; and
f2: frequency of the drive pulse signal.

15 Claims, 15 Drawing Sheets

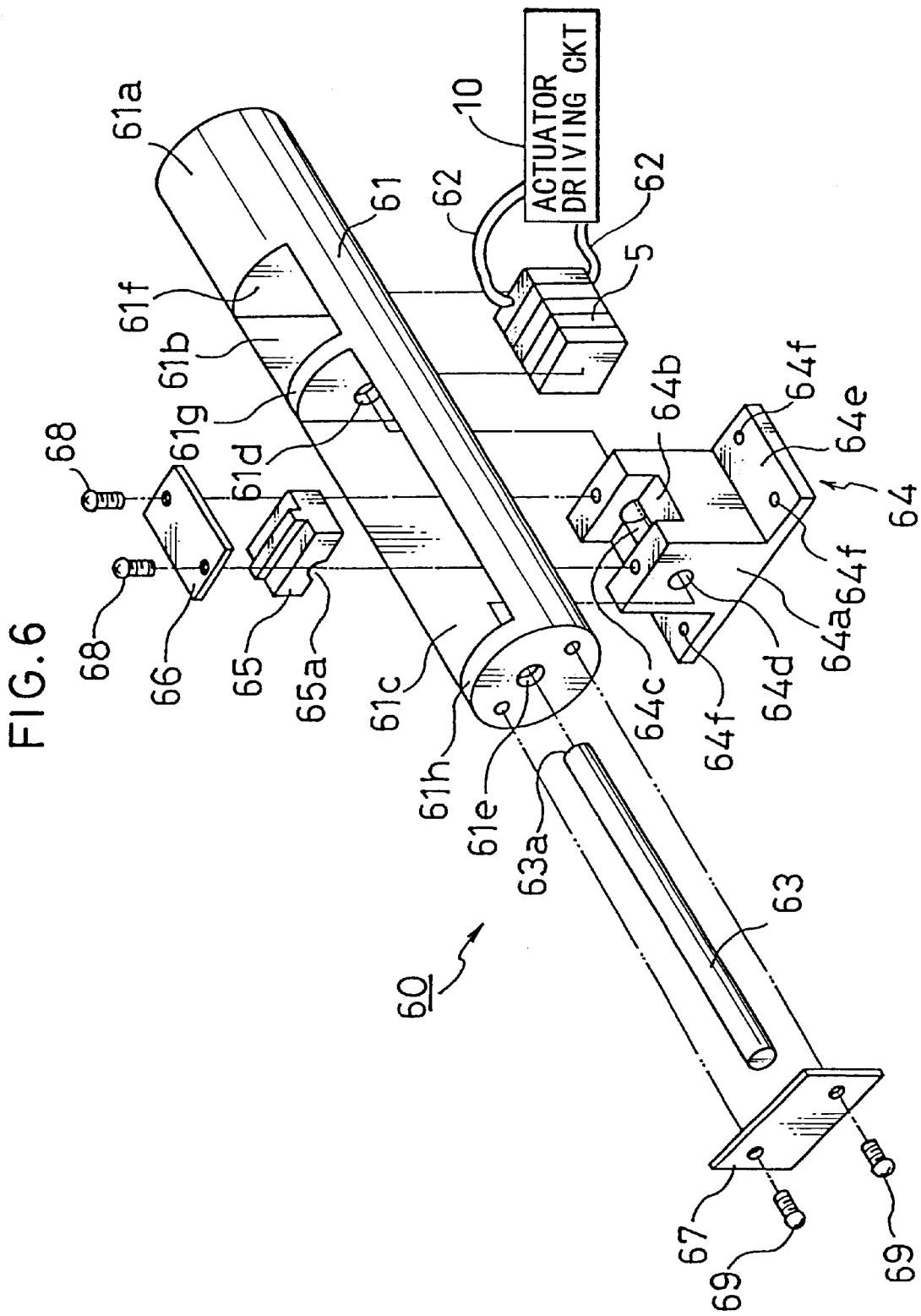

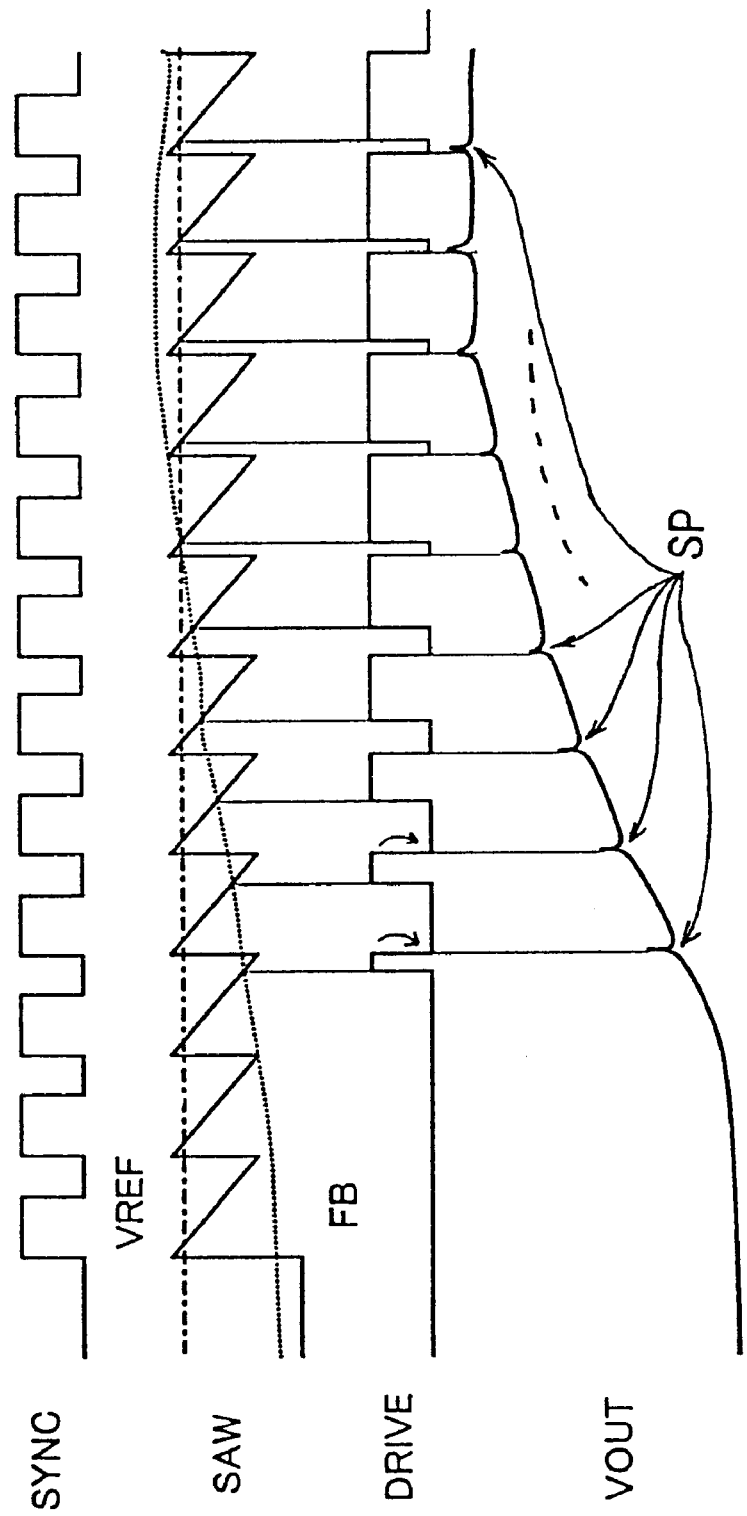

ACTUATOR DRIVING CIRCUIT, AN ACTUATOR DRIVING DEVICE, AND AN ACTUATOR DRIVING METHOD

This application is based on patent application Ser. No. 10-219221 filed in Japan, the contents of which are hereby incorporated by reference.

BACKGROUND OF THE INVENTION

This invention relates to an actuator driving circuit capable of preventing howling sounds when an actuator is driven, and an actuator driving device provided with such an actuator driving circuit, and an actuator driving method.

Conventionally, there has been known an actuator in which a driving member is fixedly attached to an electromechanical transducing element such as a piezoelectric element, and is reciprocatingly displaced by applying a drive voltage comprising a pulse having a serrated waveform to this electromechanical transducing element to expand and contract it, thereby moving a movable member coupled with the driving member by friction along expanding and contracting directions. Such an actuator is hereinafter referred to as "piezoelectric actuator").

FIG. 14 is a block diagram showing a driving circuit for the piezoelectric actuator. A voltage of about 30V is used to operate the piezoelectric actuator. Accordingly, in the case that a voltage in a power supply unit 100 is 5V as shown in FIG. 14, an output voltage from a dc-to-dc converter 102 having a switching regulator circuit 101 is boosted to 30V.

A pulse signal generated in a pulse signal generating circuit 104 of a CPU 103 has its frequency divided into a specified frequency by a pulse frequency dividing circuit 105, and a drive pulse signal having a serrated waveform is generated from this pulse and the output voltage of 30V in a drive pulse signal generating circuit 106 and applied to a piezoelectric actuator 107.

FIG. 15 is a diagram showing a circuit construction of the switching regulator circuit 101 of FIG. 14, and FIG. 16 is a timing chart showing waveforms of voltages from the respective outputs in FIG. 15.

A field-effect transistor Q is turned on and off by a PWM drive voltage DRIVE from a drive circuit 110. By turning the transistor Q on and off, storage of energy in a coil L and discharge thereof from the coil L are continuously performed, and a capacitor C is charged with this energy to increase an output voltage VOUT as shown in FIG. 16.

On the other hand, a feedback signal FB is obtained by amplifying a difference between the output voltage VOUT and a reference voltage VREF by an error amplifier 111, and a serrated wave signal SAW is outputted from a serrated wave signal generating circuit 112 in accordance with a synchronization pulse SYNC of a specified frequency. A PWM signal is outputted after the feedback signal FB and the serrated wave signal SAW are compared by a PWM comparator 113, and the PWM drive voltage DRIVE from the drive circuit 110 is controlled, thereby controlling an on-off duty ratio of the transistor Q. As a result, the output voltage VOUT is held at a specified level.

In the switching regulator circuit of FIG. 15, power noise is generated when the energy stored in the coil L is discharged by turning the transistor Q off as shown in the waveform of the output voltage VOUT in FIG. 16. This power noise affects the output voltage via wiring, with the result that the output voltage may be rippled and/or spike voltages SP may be added thereto as shown in FIG. 16. If the drive pulse signal having a serrated waveform comprising a driving voltage experiencing this spike voltage SP is applied to the piezoelectric actuator 107, the piezoelectric actuator 107 slightly expands and contracts in synchronism with the spike voltage SP. These expansion and contraction generate sounds.

If a switching frequency obtained by turning the transistor Q on and off and the frequency of the drive pulse signal fed to the piezoelectric actuator 107 are both ultrasonic frequency, the sounds generated by the expansion and the contraction of the piezoelectric actuator 107 by the drive pulse signal and by the spike voltage lie outside an audible range by humans. However, if the expansion and the contraction by the drive pulse signal and those by the spike voltage interfere each other, the so-called "howling" occurs. At this stage, if "howling" of an audible frequency is produced, this becomes a noise, thereby giving an unpleasant feeling to humans.

Japanese Unexamined Patent Publication No. 8-80075 discloses an apparatus provided with a plurality of ultrasonic actuators whose drive frequencies are ultrasonic frequencies, in which the respective drive frequencies are so set as not to cause mechanical howling between the actuators.

SUMMARY OF THE INVENTION

It is an object of the present invention to provide an actuator driving circuit, an actuator driving device, and an actuator driving method which have overcome the problems residing in the prior art.

It is another object of the present invention to provide an actuator driving circuit, an actuator driving device, and an actuator driving method which can make howling quieter by shifting the frequency of howling produced from an actuator itself resulting from imposition of a power noise onto a drive pulse signal for driving an actuator.

According to an aspect of the present invention, an actuator driving circuit comprises a drive pulse signal generator for generating a drive pulse signal having a specified ultrasonic frequency, and a drive voltage generator for generating a drive voltage for drive pulse signal generation upon receipt of a power supplied from a power source. The relationship between the frequency of power noise cyclically produced from the drive voltage generator and imposed on the drive voltage and the frequency of the drive pulse signal is so set as to satisfy the following equation:

$$4000 < |m \cdot f1 - n \cdot f2|$$

wherein
 m: positive integer below a specified value;
 n: positive integer below a specified value;
 f1: frequency of power noise; and
 f2: frequency of the drive pulse signal.

The actuator may be a ultrasonic motor, and have an electromechanical transducing element expandable and contractible in accordance with the drive pulse signal.

According to another aspect of the present invention, an actuator driving device comprises the above-mentioned actuator driving circuit, a drive member secured to one end of an electromechanical transducing element arranged in the actuator its expanding and contracting directions, and a friction member frictionally coupled with the driving member.

According to still another aspect of the present invention, an actuator driving method comprises generating a drive voltage upon receipt of a power supplied from a power source, generating a drive pulse signal upon receipt of the generated drive voltage, the drive pulse signal being generated at a frequency (f2) satisfying the following equation:

$$4000 < |m \cdot f1 - n \cdot f2|$$

wherein m: positive integer below a specified value;

n: positive integer below a specified value; and f1:frequency of power noise cyclically produced in the drive voltage generation and imposed on the drive voltage; and supplying the generated drive pulse signal to an actuator.

These and other objects, features and advantages of the present invention will become more apparent upon a reading of the following detailed description and accompanying drawings.

BRIEF DESCRIPTION OF THE DRAWINGS

FIG. 6 is an exploded perspective view showing a construction of an actuator driving device provided with the actuator driving circuit;

FIG. 16 is a timing chart showing waveforms of voltages from the respective outputs of the switching regulator circuit of FIG. 15.

DETAILED DESCRIPTION OF THE PREFERRED EMBODIMENTS OF THE INVENTION

Figure 1:
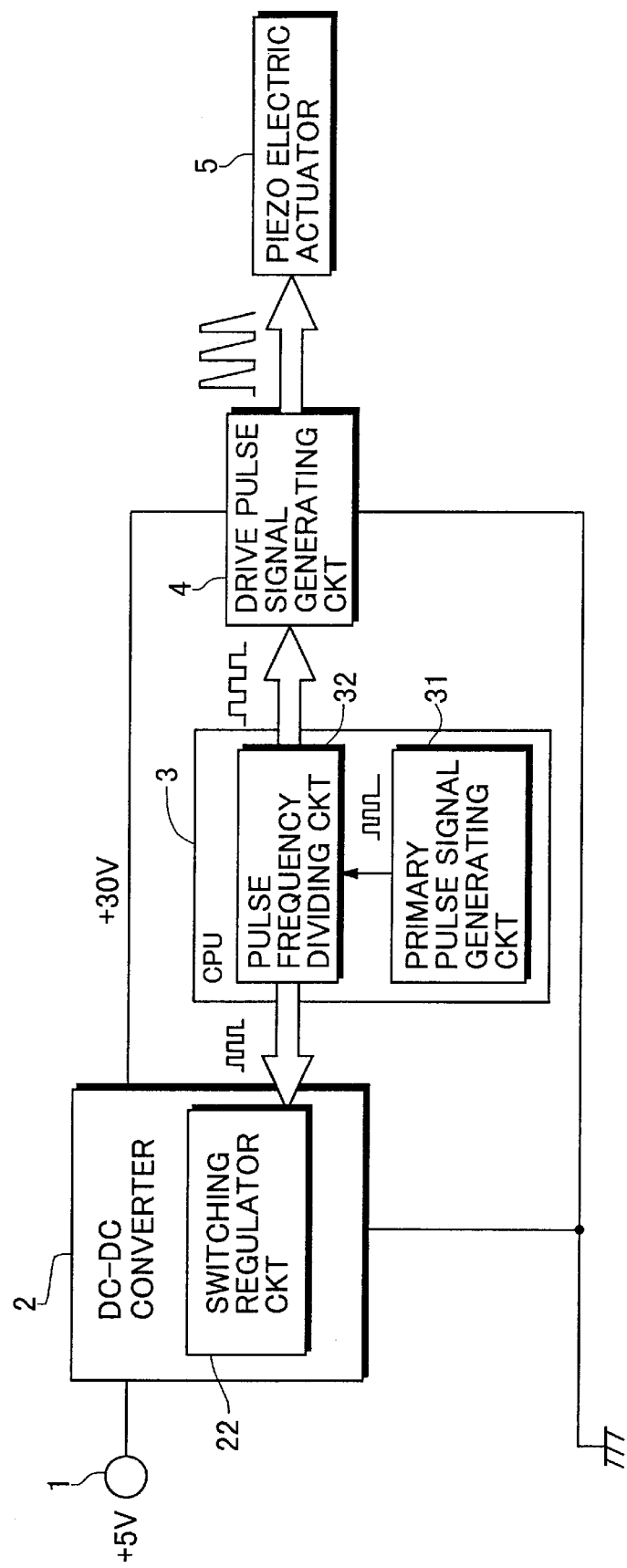
FIG. 1 is a block diagram showing a construction of an actuator driving circuit according to an embodiment of the invention.

FIG. 1 is a block diagram showing an actuator driving circuit embodying the invention. The actuator driving circuit 10 is provided with a power supply 1, a dc-to-dc converter (drive voltage generator) 2, a CPU 3 and a drive pulse signal generating circuit (drive pulse signal generator) 4, and is adapted to drive a piezoelectric actuator 5 as an actuator. The dc-to-dc converter 2 includes a switching regulator circuit 22 for boosting a supply voltage of 5V from the power supply 1 to 30V.

The CPU 3 includes a primary pulse signal generating circuit 31 having a crystal or ceramic oscillator, and a pulse-frequency dividing circuit 32 for dividing the frequency of a primary pulse signal generated by the primary pulse signal generating circuit 31 into specified frequencies. A pulse signal having a first divided frequency is outputted to the switching regulator circuit 22 to set the switching frequency of the switching regulator circuit 22, and a pulse signal having a second divided frequency is outputted to the drive pulse signal generating circuit 4 to set the frequency of the drive pulse signal generated by the drive pulse signal generating circuit 4.

The drive pulse signal generating circuit 4 generates a drive pulse signal having a serrated waveform using the output voltage from the dc-to-dc converter 2 and the pulse signal from the CPU 3 and drives the piezoelectric actuator 5 by feeding this drive pulse signal thereto. The piezoelectric actuator 5 includes an electromechanical transducing element (for example, piezoelectric element in this embodiment), and displaces a movable member in expanding and contracting direction by its expansion and contraction. This movement is described in detail later.

Figure 2:
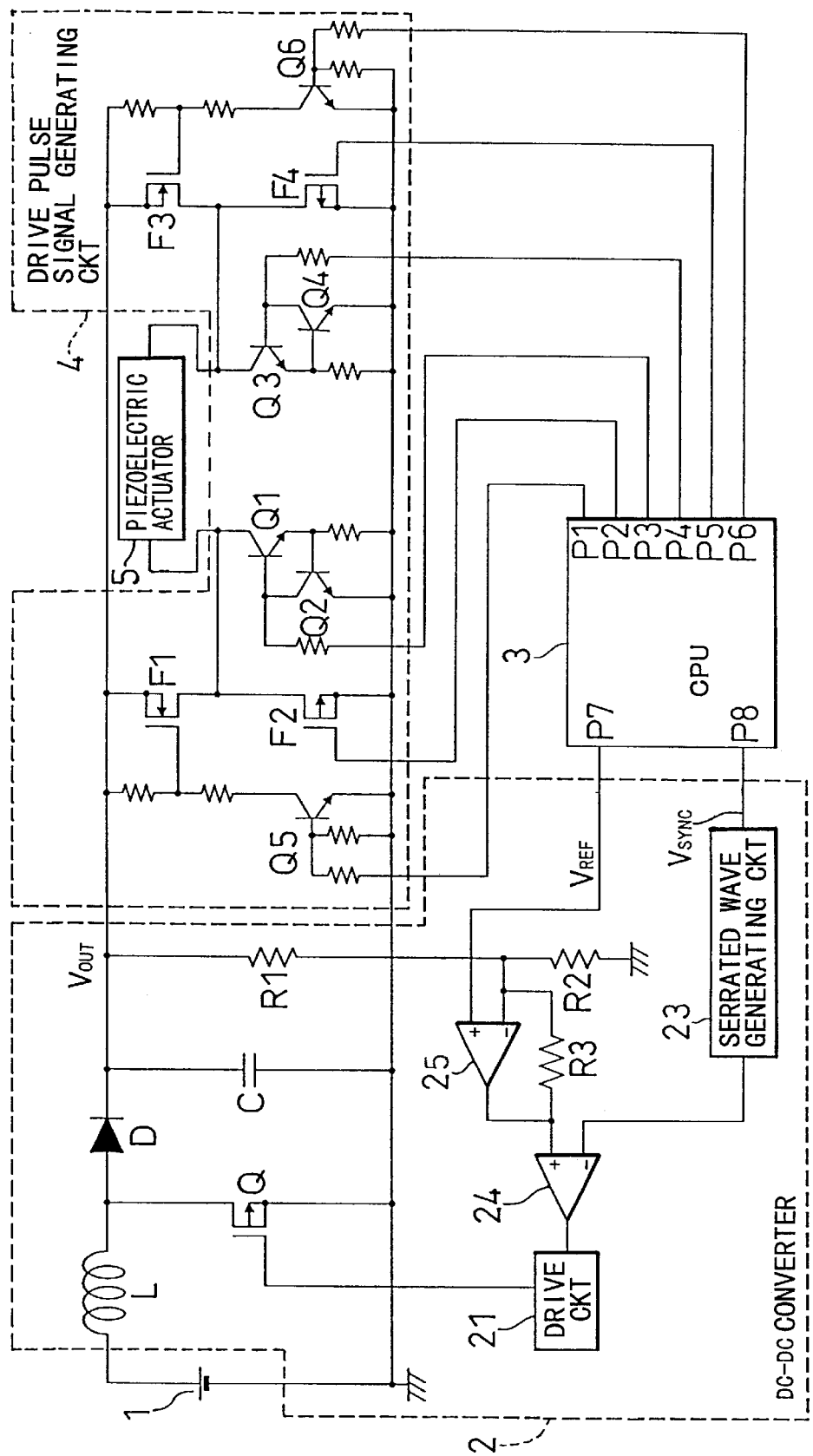
FIG. 2 is a circuit diagram showing a circuitry of the actuator driving circuit.

FIG. 2 is a circuit diagram showing a specific circuitry of the actuator driving circuit of FIG. 1. The power supply 1 is a dc power supply of a voltage of 5V. The dc-to-dc converter 2 includes a coil L, a field effect transistor Q, a diode D, a capacitor C, resistance elements R1 to R3, a drive circuit 21, an error amplifier 25, a serrated wave generating circuit 23 and a PWM comparator 24. The drive pulse signal generating circuit 4 includes field effect transistors F1 to F4, NPN transistors Q1 to Q6 and a group of resistance elements.

The CPU 3 has the following functions.

(1) Function of generating the drive pulse signal to be sent to the piezoelectric actuator 5 based on signals outputted to the drive pulse signal generating circuit 4 from output terminals P1 to P6. It should be noted that the frequency of the drive pulse signal is set equal to or above an upper limit value (about 20 kHz) of an audible frequency range by humans.

(2) Function of outputting a reference voltage signal $V_{REF}$ from an output terminal P7.

(3) Function of outputting a synchronization pulse signal $V_{SYNC}$ from an output terminal P8. It should be noted that the frequency of the synchronization pulse signal $V_{SYNC}$ is set at a specified frequency to be described later, which is higher than that of the drive pulse signal supplied to the piezoelectric actuator 5.

Figure 15:
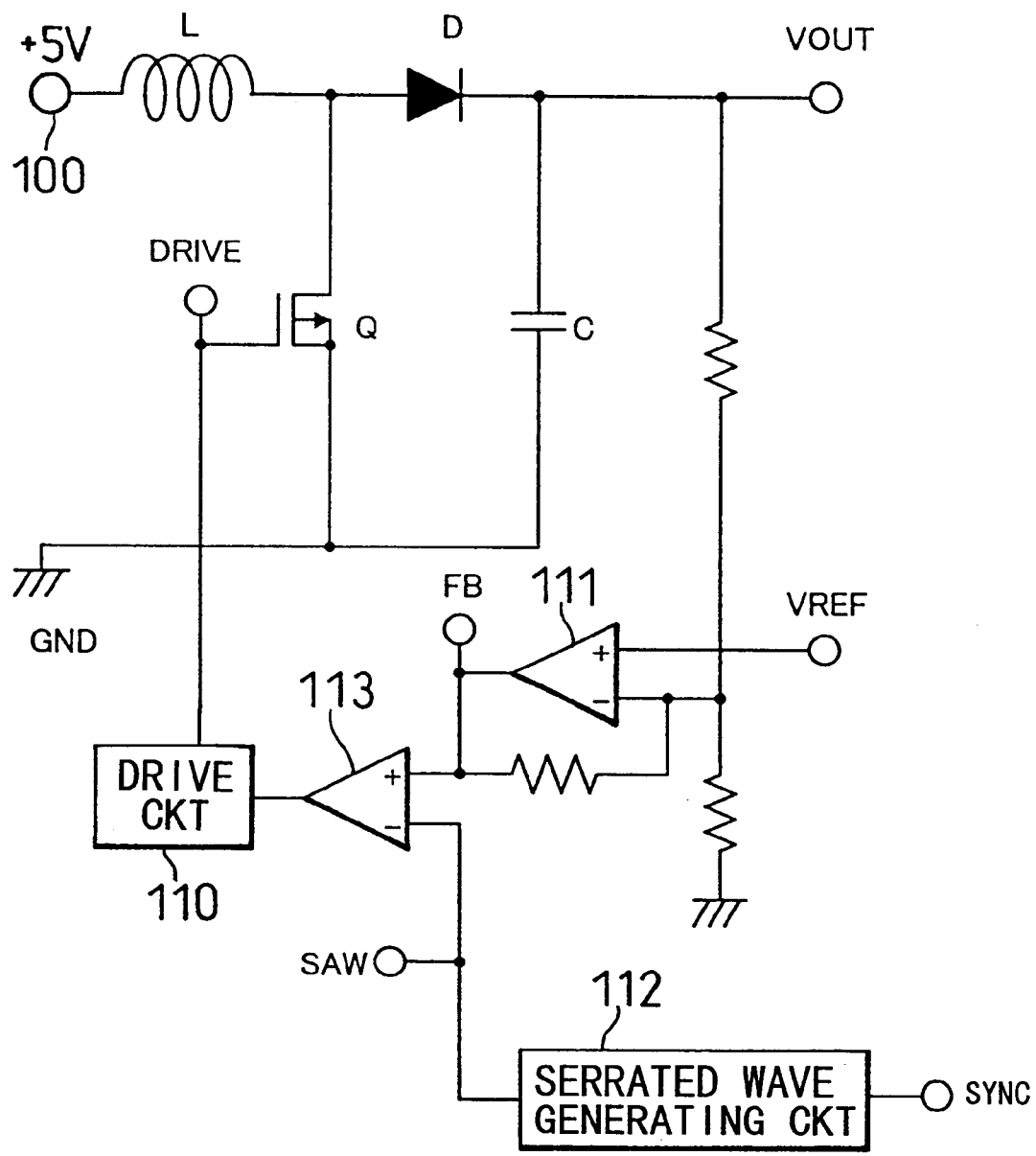
FIG. 15 is a circuit diagram showing a switching regulator circuit provided in the conventional driving circuit of FIG. 14.

Next, the dc-to-dc converter 2 is described with reference to FIG. 2. The dc-to-dc converter 2 is a switching power supply circuit and has substantially the same construction as that of FIG. 15. Specifically, one end of the coil L is connected with a positive electrode of the power supply 1, and the transistor Q is connected between the other end of the coil L and the ground. With the other end of the coil L are connected the diode D for rectifying a power from the coil L and the capacitor C for accumulating the power rectified by the diode D. A line connected with a cathode of the diode D serves as an output voltage line.

A connection point of the resistors R1, R2 connected in series between the output voltage line and the ground is connected with an inverted input terminal of the error amplifier 25, and the output terminal P7 of the CPU 3 is connected with a non-inverted input terminal of the PWM comparator 24 and an inverted input terminal thereof via a feedback resistor R3. An output terminal P8 of the CPU 3 is connected with the serrated wave generating circuit 23, which is connected with an inverted input terminal of the PWM comparator 24. An output terminal of the PWM comparator 24 is connected with the drive circuit 21, whose output terminal is connected with a gate of the transistor Q.

The dc-to-dc comparator 2 operates in the same manner as that of FIG. 16. Specifically, the field effect transistor Q is turned on and off by the PWM drive voltage signal from the drive circuit 21. Energy is accumulated in the coil L when the transistor Q is on, whereas the energy accumulated in the coil L is discharged when the transistor Q is off to charge the capacitor C. By charging the capacitor C by the repetitive accumulation and discharge of the energy in and from the coil L, an output voltage $V_{OUT}$ which is higher than the supply voltage from the power supply 1 can be obtained.

At this time, a feedback signal obtained by amplifying a difference between a voltage obtained by dividing the output voltage $V_{OUT}$ by the resistors R1, R2 and the reference voltage $V_{REF}$ outputted from the output terminal P7 of the CPU 3 by the error amplifier 25 is obtained. The serrated wave generating circuit 23 outputs a serrated wave signal using the pulse signal $V_{SYNC}$ of the specified frequency outputted from the output terminal P8 of the CPU 3. The feedback signal and the serrated wave signal are compared by the PWM comparator 24, which then sends a PWM signal. The on-off duty ratio of the transistor Q is controlled by controlling the PWM drive voltage signal outputted from the drive circuit 21 using this PWM signal, thereby keeping the output voltage $V_{OUT}$ at a specified level.

Figure 3:
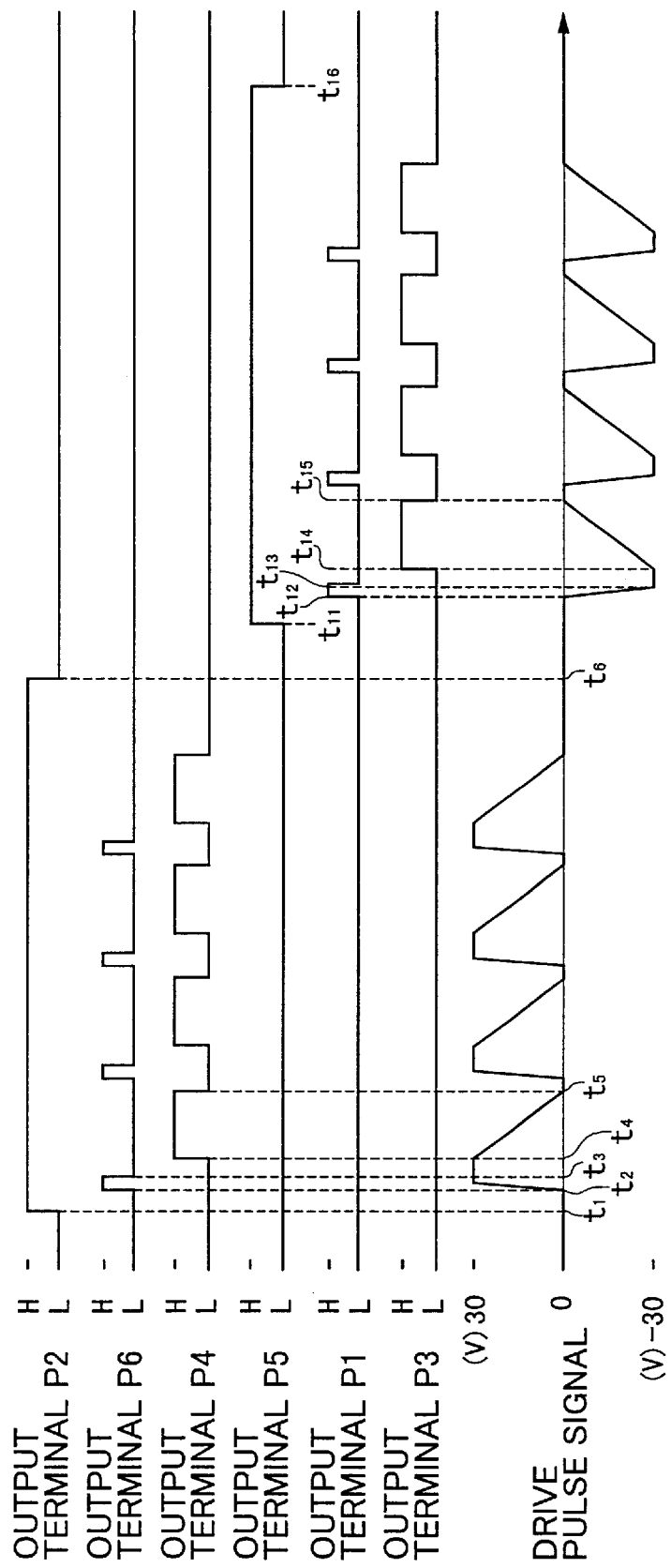
FIG. 3 is a timing chart showing voltage waveforms of output signals of the respective terminals and a drive pulse signal.

Next, the driving principle of the piezoelectric actuator 5 is described with reference to FIGS. 2 to 5C. FIG. 3 is a timing chart showing voltage waveforms of the output signals from the respective terminals and the drive pulse signal, and FIGS. 4A to 4C and 5A to 5C are diagrams showing motions of the movable member caused by the piezoelectric actuator 5.

In FIGS. 4A to 4C and 5A to 5C, a drive shaft (driving member) 52 is secured to the leading end (one end) of the piezoelectric actuator 5 at its right side, and a fixing member 51 is fixed to the base end of the piezoelectric actuator 5 at its left side. The drive shaft 52 is transversely movable in FIGS. 4A to 4C and 5A to 5C, and a movable member (friction member) 53 is coupled with the drive shaft 52 by friction.

Figure 4A:
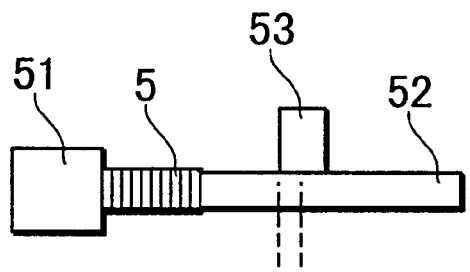
FIGS. 4A to 4C are diagrams showing one motion of a movable member by a piezoelectric actuator.

First, a case where the movable member 53 is moved to the right is described with reference to FIGS. 4A to 4C. An initial state is shown in FIG. 4A. First, the transistor F2 is turned on by outputting a high-level signal from the output terminal P2 to ground the left end side of the piezoelectric actuator 5 ($t_1$ in FIG. 3). Then, a high-level signal is outputted from the output terminal P6 to turn the transistor Q on, thereby turning the transistor F3 on to quickly charge the piezoelectric actuator 5 to a level of the output voltage (here, 30V). Thereafter, the output signal from the output terminal P6 is switched to low level to turn the transistor F3 off ($t_2$ to $t_3$ in FIG. 3).

Figure 4B:
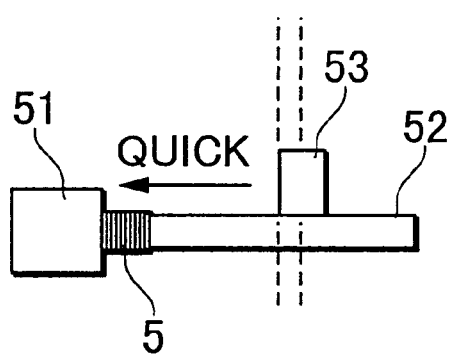
Figure 4C:
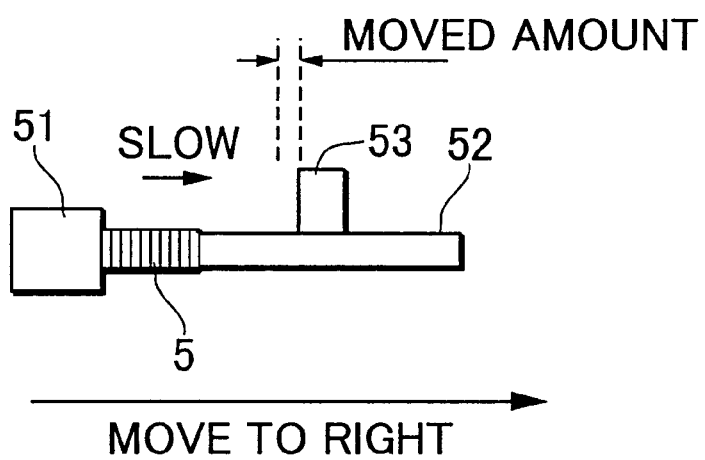

During the rapid rise of the drive pulse signal of a serrated wave applied to the piezoelectric actuator 5, the piezoelectric quickly contracts toward the left as shown in FIG. 4B. However, the movable member 53 remains in its initial position since its inertial force to stay there exceeds a frictional coupling force.

Subsequently, a high-level signal is outputted from the output terminal P4 to turn the transistors Q3, Q4 on, thereby driving a constant-current circuit comprised of the transistors Q3, Q4. As a result, electric charges accumulated in the piezoelectric actuator 5 are slowly and gently discharged ($t_4$ to $t_5$ in FIG. 3).

During the gentle fall of the drive pulse signal of the serrated wave applied to the piezoelectric actuator 5, the piezoelectric actuator 5 slowly expands. Accordingly, the movable member 53 coupled with the drive shaft 52 by friction is moved to the right together with the drive shaft 52 as shown in FIG. 4C. After the supply of the drive pulse signal is repeated by the number of times required for the movable member 53 to move to the right by a desired distance (four times in FIG. 3), the output signal from the output terminal P2 is switched to low level to turn the transistor F2 off ($t_6$ in FIG. 3).

Figure 5A:
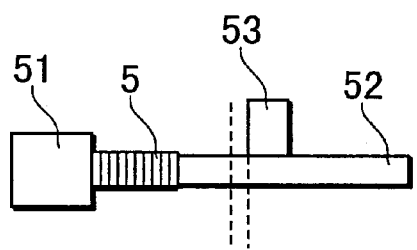
FIGS. 5A to 5C are diagrams showing another motion of the movable member by the piezoelectric actuator.

Next, a case where the movable member 53 is moved to the left is described with reference to FIGS. 5A to 5C. An initial state is shown in FIG. 5A. First, a high-level signal is outputted from the output terminal P5 to turn the transistor F4 on, thereby grounding the right end side of the piezoelectric actuator 5 ($t_{11}$ in FIG. 3). Then, the high-level signal is outputted from the output terminal P1 to turn the transistor Q5 on, thereby turning the transistor F1 on. After the piezoelectric actuator 5 is rapidly charged to a level of the output voltage (here, −30V), the output signal from the output terminal P1 is switched to low level to turn the transistor F1 off ($t_{12}$ to $t_{13}$ in FIG. 3).

Figure 5B:
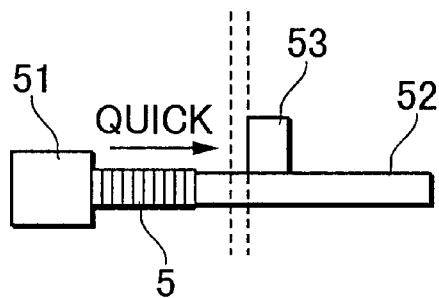
Figure 5C:
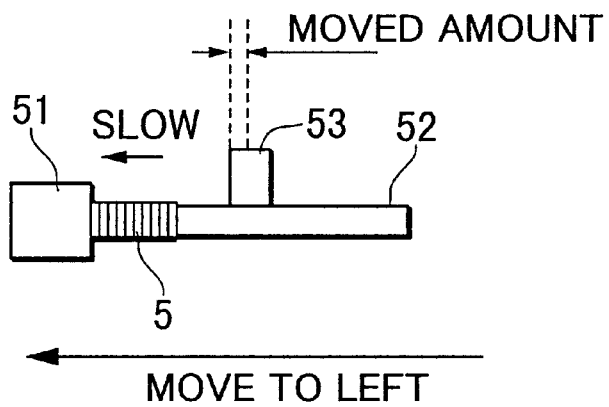

During the rapid fall of the driving pulse signal of the serrated wave applied to the piezoelectric actuator 5, the piezoelectric actuator 5 rapidly expands to the right as shown in FIG. 5B, but the movable member 53 remains in its initial position since the inertial force exceeds the frictional coupling force.

Subsequently, a high-level signal is outputted from the output terminal P3 to turn the transistors Q1, Q2 on, thereby driving the constant-current circuit comprised of the transistors Q1, Q2. As a result, electric charges accumulated in the piezoelectric actuator 5 are slowly discharged ($t_{14}$ to $t_{15}$ in FIG. 3).

During the gentle rise of the driving pulse signal of the serrated wave applied to the piezoelectric actuator 5, the piezoelectric actuator 5 slowly contracts. Accordingly, the movable member 53 coupled with the drive shaft 52 by friction is moved to the left together with the drive shaft 52 as shown in FIG. 5C. After the supply of the drive pulse signal is repeated by the number of times required for the movable member 53 to move to the left by a desired distance (four times in FIG. 3), the output signal from the output terminal P5 is switched to low level to turn the transistor F4 off ($t_{16}$ in FIG. 3).

Here, since the frequency of the drive pulse signal is set within the ultrasonic frequency range, sounds produced by the expansion and contraction of the piezoelectric actuator 5 and the movement of the movable member 53 are not audible to humans, with the result that no sounds are produced during the operation. Further, since the frequency of the synchronization signal $V_{SYNC}$ (see FIG. 2), i.e., the on-off frequency of the transistor Q (see FIG. 2) is set higher than the frequency of the drive pulse signal applied to the piezoelectric actuator 5, power can be securely supplied from the dc-to-dc converter 2 to drive the piezoelectric actuator 5.

Figure 7:
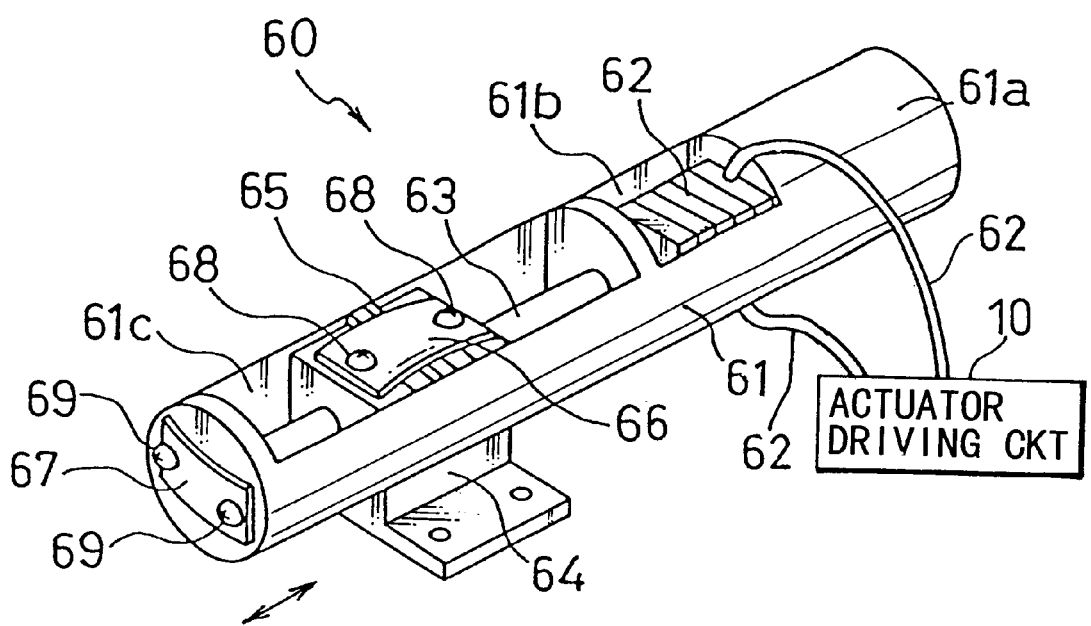
FIG. 7 is a perspective view showing the actuator driving device in its assembled state.

FIGS. 6 and 7 are perspective views showing an exemplary construction of an actuator driving device 6 provided with the actuator driving circuit 10 in its exploded state and in its assembled state, respectively.

The actuator driving device 60 includes a stationary member 61, a cable 62 for connecting the piezoelectric actuator 5 and the actuator driving circuit 10, a drive shaft 63, a slider (friction member) 64, etc. An unillustrated driven member is secured to the slider 64. The stationary member 61 and the drive shaft 63 are constructed such that the drive shaft 63 has a smaller mass than the stationary member 61.

The stationary member 61 has a substantially cylindrical shape and has its one end 61a mounted on an unillustrated device main body. The stationary member 61 is formed with a hole 61b for accommodating the piezoelectric element 5 and a hole 61c for accommodating the slider 64. A partition plate 61g is provided between the holes 61b and 61c, and an end plate 61h is provided at an end of the stationary member 61 near the hole 61c.

The piezoelectric element 5 is accommodated in the hole 61c of the stationary member 61 and has its one end adhered to an end 63a of the drive shaft 63 and its other end adhered to one wall surface 61f of the hole 61b of the stationary member 61.

The drive shaft 63 is movably supported along its longitudinal direction by a bearing hole 61d formed in the partition plate 61g of the stationary member 61 and a bearing hole 61e formed in the end plate 61h. The drive shaft 63 reciprocatingly moves along its longitudinal direction in response to the expansion and contraction of the piezoelectric element 5 along its thickness direction.

A leaf spring 67 is so secured to the end plate 61h of the stationary member 61 by screws 69 as to bias the drive shaft 63 slightly projecting from the bearing hole 61e at the one end of the stationary member 61 in its longitudinal direction. Thus, the drive shaft 63 is pressed against the piezoelectric element 5 with a specified force, which can be adjusted by the fastening degree of the screws 69.

The slider 64 includes a main body 64a held in frictional contact with the drive shaft 63 and a mount portion 64e for fixing the unillustrated driven member. The main body 64a is formed with a notched portion 64b in its middle portion, and holes 64d through which the drive shaft 63 is introduced are formed in walls at the left and right sides of the notched portion 64b. The notched portion 64b is formed with a groove 64c having a semicircular cross section to be brought into contact with a substantially lower half of the drive shaft 63. The mount portion 64e are formed with mount holes 64f through which screws are fastened to mount the driven member on the lower surface of the mount portion 64e.

A holding member 65 to be brought into contact with the drive shaft 63 penetrating the holes 64d from above is fittably inserted into the notched portion 64b. On the lower surface of the holding member 65 is formed a groove 65a having a semicircular cross section to be brought into contact with a substantially upper half of the drive shaft 63. The holding member 65 is so formed as to be closely held in contact with the left and right wall surfaces of the notched portion 64b.

A projection 65b is formed on the upper surface of the holding member 65 and is pressed downward by a leaf spring 66 secured to the main body 64a of the slider 64 by screws 68. The slider 64 and the holding member 65 are coupled with the drive shaft 63 by friction with a specified pressing force. This pressing force can be adjusted by the fastening degree of the screws 68.

In the above construction, the movable member 53 of FIGS. 4A to 4C and 5A to 5C corresponds to the slider 64, and the slider 64 is moved by the expansion and contraction of the piezoelectric element 5 according to the driving principle described with reference to FIGS. 4A to 4C and 5A to 5C. Thus, the unillustrated driven member mounted on the slider 64 is moved. In other words, the actuator driving device 60 constructs a linear actuator.

Figure 8:
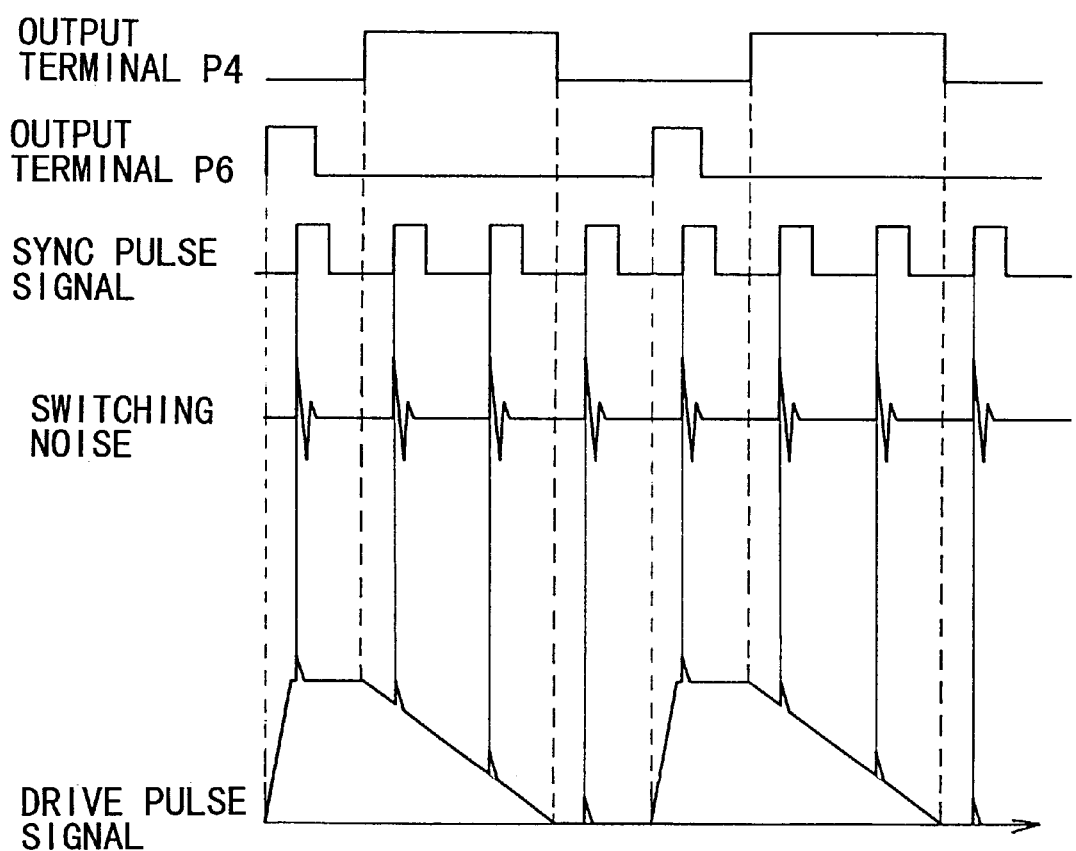
FIG. 8 is a timing chart showing a waveform of the drive pulse signal onto which a spike voltage caused by a power noise is added.

Next, influences of power noise on the drive pulse signal is described with reference to FIG. 8. FIG. 8 is a timing chart showing the waveform of the drive pulse signal onto which a spike voltage caused by power noise is added.

Since power noise is produced while the transistor Q (see FIG. 2) is off, i.e., during the rise of the synchronization pulse signal $V_{SYNC}$ as shown in FIG. 8, the frequency thereof is equal to that of the synchronization signal $V_{SYNC}$. Spike voltages appear in the drive pulse signal as shown in FIG. 8 by the power noise added in the output line connected with the cathode of the diode D (see FIG. 2).

Since the frequency of the synchronization signal $V_{SYNC}$, i.e., the on-off frequency of the transistor Q is set higher than the frequency of the drive pulse signal applied to the piezoelectric actuator 5, the frequency of the power noise also lies within the ultrasonic frequency range. Accordingly, sounds of vibration caused by the power noise and drive pulse signals are not audible to humans. However, howling occurs by the interference of waves if two waves are combined as in the drive pulse signal shown in FIG. 8:

$$f0=|m\cdot f1-n\cdot f2| \qquad (1).$$

A howling frequency f0 is expressed by Equation (1), where f1 denotes a frequency of the drive pulse signal, f2 a switching frequency of the transistor Q, m, n positive integers. In Equation (1), the respective terms on the right side represent harmonics of the respective frequencies f1, f2 if m, n exceed 2.

The sensitivity of human audibility is generally highest near 1 kHz. Accordingly, if the howling frequency is sufficiently higher than 1 kHz, howling becomes hard to hear since the sensitivity of human audibility is reduced. On the other hand, the frequency of the drive pulse signal of the piezoelectric actuator 5 is determined depending on the characteristic thereof.

Thus, the CPU 3 sets the switching frequency f2 of the transistor Q such that a relationship between the frequency f1 of the drive pulse signal and the switching frequency f2 of the transistor Q can be defined by Equation (2):

$$4000 < f0 = |m\cdot f1 - n\cdot f2| \qquad (2)$$

where m denotes an integer satisfying $1 \leq m \leq M$, n an integer satisfying $1 \leq n \leq N$, $2 \leq m$, $2 \leq n$ represent orders of harmonics. M, N may be set at specified positive integers realizing orders where amplitude is reduced to the extent that howling is hard to hear. This makes the howling frequency f0 two or more octaves higher than 1 kHz, with the result that howling becomes hard to hear.

Next, the howling frequency when the switching frequency f2 of the transistor Q is changed in relation to the frequency of the drive pulse signal is described with reference to TABLE-1 and TABLE-2, which show the howling frequency f0 obtained from the respective frequencies f1, f2 in accordance with Equation (1) in ranges of $1 \leq m \leq 8$, $1 \leq n < 4$. In this embodiment, the frequency f1 of the drive pulse signal is set at 25 kHz.

TABLE 1

| | | f2: Switching Frequency [kHz] | | | |
|---|---|---|---|---|---|
| | n | 1 | 2 | 3 | 4 |
| m | f | 110 | 220 | 330 | 440 |
| f1: | 1 | 25 | 85 | 195 | 305 | 415 |
| Drive | 2 | 50 | 60 | 170 | 280 | 390 |
| Pulse | 3 | 75 | 35 | 145 | 255 | 365 |
| Freq. | 4 | 100 | 10 | 120 | 230 | 340 |
| [kHz] | 5 | 125 | 15 | 95 | 205 | 315 |
| | 6 | 150 | 40 | 70 | 180 | 290 |
| | 7 | 175 | 65 | 45 | 155 | 265 |
| | 8 | 200 | 90 | 20 | 130 | 240 |

In TABLE-1, the switching frequency f2 is set at 110 kHz which is 4.4 times the frequency f1 of the drive pulse signal by the CPU 3. In such a case, the frequency of the howling produced by the harmonics of the respective frequencies f1, f2 is lowest at 10 kHz when m=4, n=1 in the ranges of $1 \leq m \leq 8$, $1 \leq n \leq 4$. Accordingly, the sounds produced by howling can hardly be heard as long as amplitude is not too large since all howling frequencies lie within a range where human audibility is low.

Since harmonic components of high orders have generally small amplitude, the howling sounds produced by harmonics in the range of $1 \leq m \leq 8$, $1 \leq n \leq 4$ hardly becomes too loud. Here, M=8, N=4.

TABLE 2

| | | f2: Switching Frequency [kHz] | | | |
|---|---|---|---|---|---|
| | n | 1 | 2 | 3 | 4 |
| m | f | 98.75 | 197.5 | 296.3 | 395 |
| f1: | 1 | 25 | 73.75 | 172.5 | 271.3 | 370 |
| Drive | 2 | 50 | 48.75 | 147.5 | 246.3 | 345 |
| Pulse | 3 | 75 | 23.75 | 122.5 | 221.3 | 320 |
| Freq. | 4 | 100 | 1.25 | 97.5 | 196.3 | 295 |
| [kHz] | 5 | 125 | 26.25 | 72.5 | 171.3 | 270 |
| | 6 | 150 | 51.25 | 47.5 | 146.3 | 245 |
| | 7 | 175 | 76.25 | 22.5 | 121.3 | 220 |
| | 8 | 200 | 101.3 | 2.5 | 96.25 | 195 |

Contrary to TABLE-1, TABLE-2 shows comparative examples, where the switching frequency f2 is set at 98.75 kHz which is 3.95 times the frequency f1 of the drive pulse signal. In this case, the howling frequency is 1.25 kHz when m=4, n=1 and 2.5 kHz when m=8, n=2, i.e., lies in a human audible range and does not satisfy Equation (2). These are lower harmonics of the first to eighth orders. Generally, the amplitudes of the lower harmonics are large. Based on the above, in the case of TABLE-2, there is a high possibility that the howling sounds are audible.

As described above, in this embodiment, the CPU 3 sets the switching frequency f2 of the transistor Q such that a relationship between the frequency f1 of the drive pulse signal and the switching frequency f2 of the transistor Q is as defined by Equation (2). The production of sounds by the howling of the power noise and the drive pulse signal can be prevented, thereby making the driving circuit quieter.

The drive pulse signal applied to the piezoelectric actuator 5 and the pulse signal for setting a switching timing of the transistor Q may be generated using a single primary pulse signal generating circuit 31. By doing so, the switching frequency f2 of the transistor Q can be accurately and easily set in relation to the frequency f1 of the drive pulse signal.

The present invention is not limited to the foregoing embodiment, but may be embodied as follows.

Figure 9:
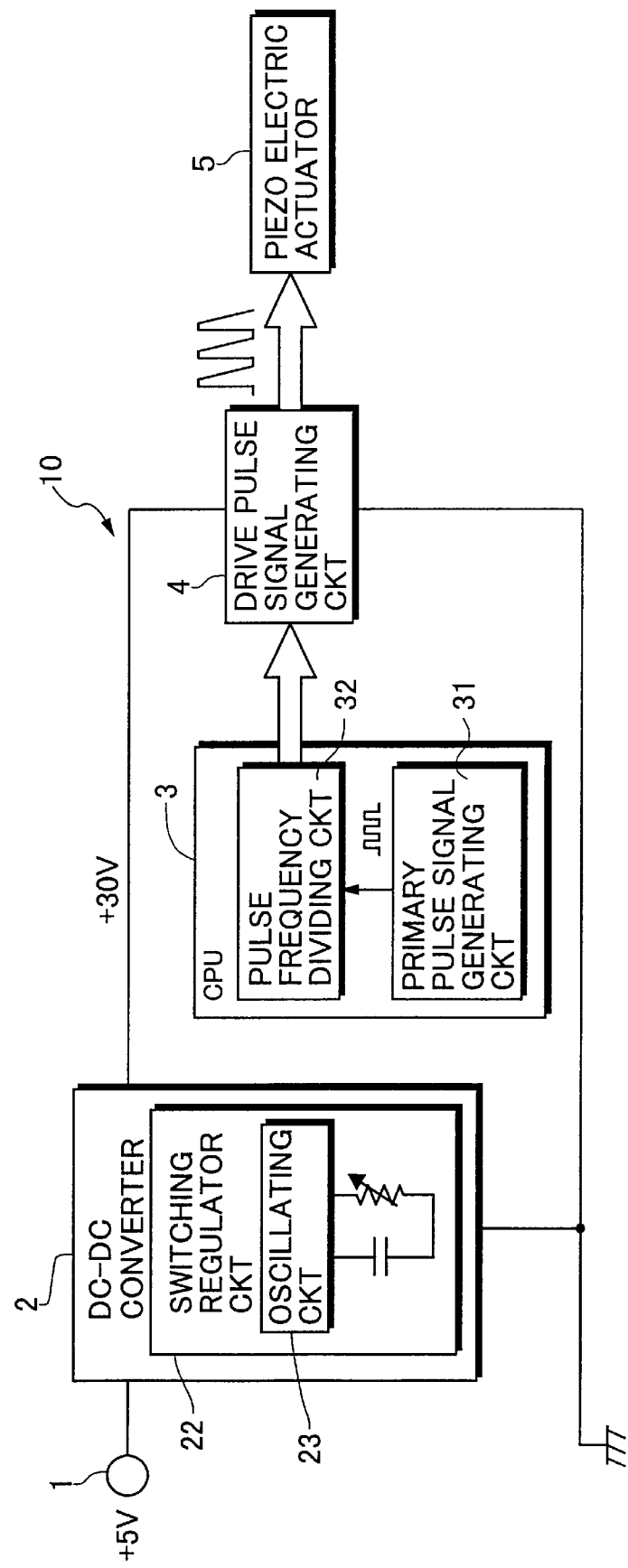
FIG. 9 is a block diagram showing a modification of the actuator driving circuit.

(1) Instead of the switching regulator circuit 22 shown in FIG. 1, a switching regulator circuit 22 comprised of an oscillating circuit 23, a capacitor and a variable resistor as shown in FIG. 9 may be provided. In this case, the switching timing of the dc-to-dc converter 2 may be set by the oscillating circuit 23 instead of the CPU 3. According to this embodiment, the same effects as the foregoing embodiment can be obtained by adjusting the capacity of the capacitor and the resistance value of the variable resistor. Further, in this case, a general IC having a regulating function may be used as the switching regulator circuit 22.

(2) The CPU 3 sets the switching frequency f2 of the transistor Q such that a relationship between the frequency f1 of the drive pulse signal and the switching frequency f2 of the transistor Q is as defined by Equation (3):

$$fc < f0 = |m \cdot f1 - n \cdot f2| \tag{3}$$

where fc denotes an upper limit value of the human audible frequency range. According to this embodiment, the production of sounds by howling can be more satisfactorily prevented since the howling frequency lies beyond the human audible frequency range.

(3) The CPU 3 may synchronize the timing of the drive pulse signal applied to the piezoelectric actuator 5 and the switching timing of the transistor Q as defined by Equation (4):

$$f1/k = f2/j \tag{4}$$

where j denotes an integer satisfying $1 \leq j \leq J$, k an integer satisfying $1 \leq k \leq K$, J, K specified positive integers, and j and k are prime to each other. Equation (5) can be obtained by putting Equation (4) into Equation (2).

$$4000 < f0 = |m \cdot f1 - n \cdot f2| = |m \cdot k/j - n| \cdot f2 = |m \cdot k - n \cdot j| \cdot f2/j \tag{5}$$

In Equation (5), $|m \cdot k - n \cdot j|$ is an integer above 0. Therefore, the frequency f0 of the produced howling has frequency components which are a multiple of (f2/j).

Accordingly, the howling sounds can be made hard to hear as in the foregoing embodiments by controlling the frequency of the pulse signal outputted from the output terminal P8 (see FIG. 2) of the CPU 3 to control the switching frequency f2 of the transistor Q (see FIG. 2) so as to satisfy Equation (6):

$$4000 < (f2/j) \tag{6}$$

When $m \cdot k = n \cdot j$, the howling frequency f0 is 0 by Equation (5). This case shows no production of howling.

If the CPU 3 executes such a control as to satisfy Equation (7) instead of Equation (6) in this embodiment, the production of sounds by howling can be more satisfactorily prevented since the howling frequency lies beyond the human audible frequency range:

$$fc < (f2/j) \tag{7}$$

In TABLE-3 below, the frequency f1 of the drive pulse signal is set at 25 kHz as in TABLE-1 and TABLE-2 and the switching frequency f2 is set at 100 kHz which is four times the frequency f1 of the drive pulse signal. In other words, k=1, j=4 in Equation (4).

TABLE 3

| | | f2: Switching Frequency [kHz] | | | |
|---|---|---|---|---|---|
| | n | 1 | 2 | 3 | 4 |
| m | f | 100 | 200 | 300 | 400 |
| f1: Drive Pulse Freq. [kHz] | 1 | 25 | 75 | 175 | 275 | 375 |
| | 2 | 50 | 50 | 150 | 250 | 350 |
| | 3 | 75 | 25 | 125 | 225 | 325 |
| | 4 | 100 | 0 | 100 | 200 | 300 |
| | 5 | 125 | 25 | 75 | 175 | 275 |
| | 6 | 150 | 50 | 50 | 150 | 250 |
| | 7 | 175 | 75 | 25 | 125 | 225 |
| | 8 | 200 | 100 | 0 | 100 | 200 |

As shown in TABLE-3, the howling frequency is 0 when m=4, n=1 and when m=8, n=2. This indicates that howling is a direct current and the vibration caused by the howling is not generated. The howling frequencies are equal to or above the upper limit value of the audible frequency range, i.e. ultrasonic frequency in all cases except the above cases. Accordingly, no sound is generated by the howling. Here, M=8, N=4 as in TABLE-1.

Figure 10:
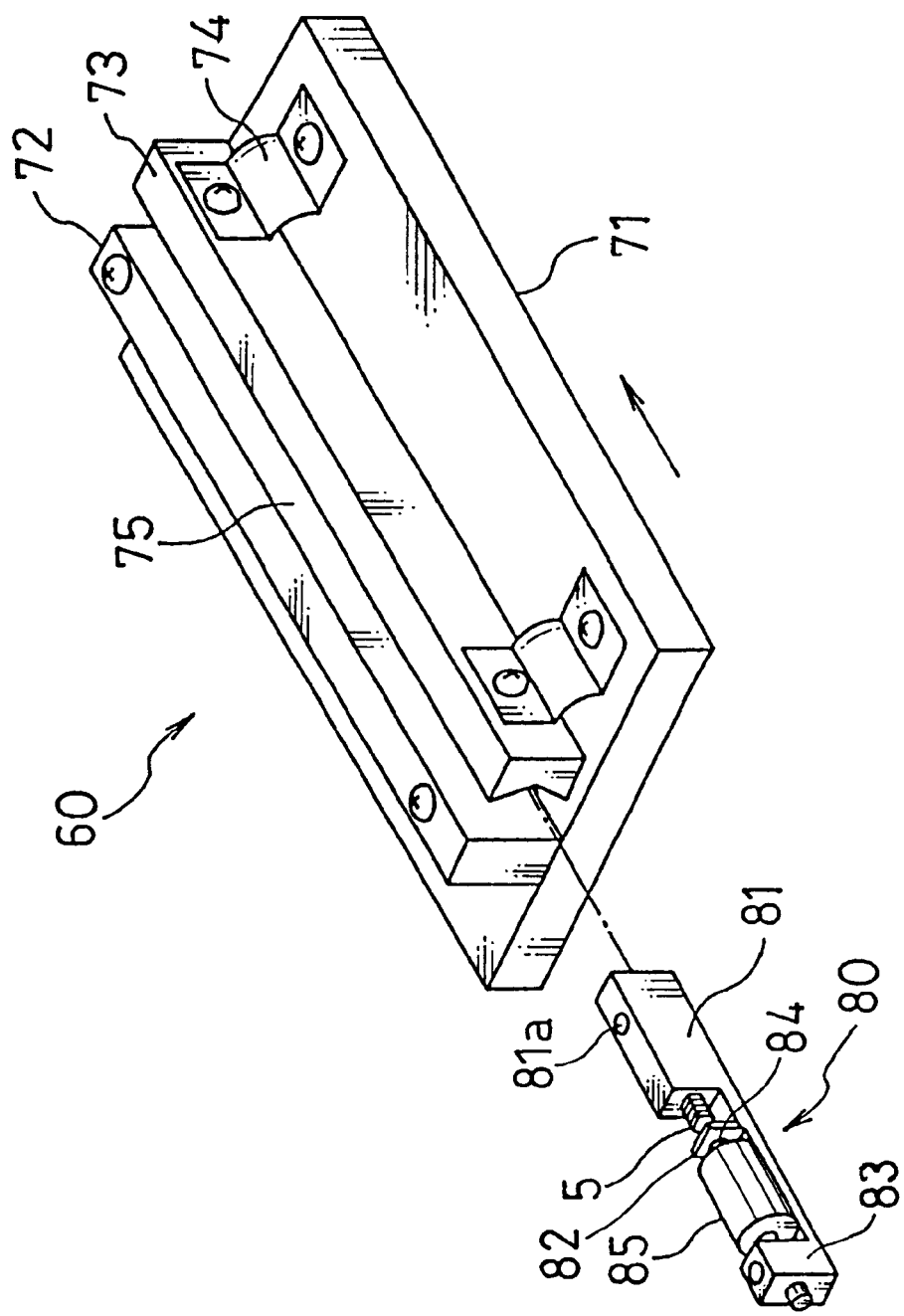
FIG. 10 is a perspective view showing another actuator driving device of the invention, a driving unit being detached.
Figure 11:
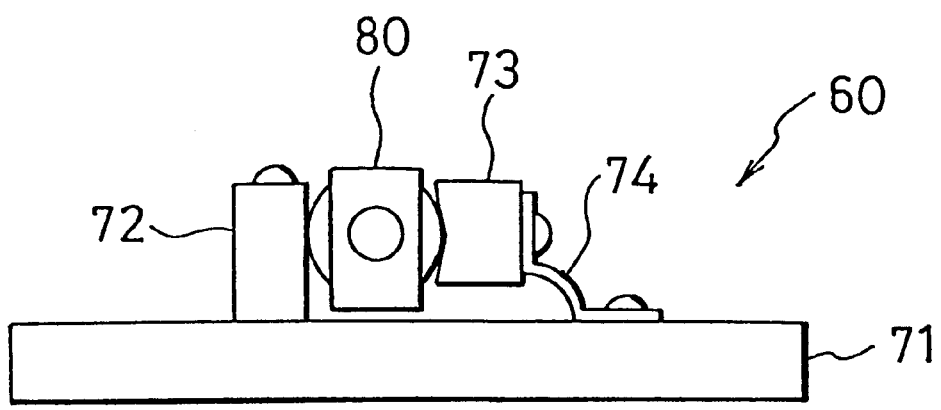
FIG. 11 is a side view of the actuator driving device of FIG. 10 with the driving unit mounted.

(4) The actuator driving device 60 is not limited to the one shown in FIGS. 6 and 7. FIGS. 10 and 11 show another actuator driving device 60, wherein FIG. 10 is a perspective view of the actuator driving device 60 with a driving unit 80 detached and FIG. 11 is a side view thereof with the driving unit 80 mounted, respectively. This actuator driving device 60 includes a base 71, guide members (friction members) 72, 73 provided on the base 71, and the driving unit 80 disposed between the guide members 72, 73.

The guide member 73 is formed with a groove having a substantially V-shaped cross section. The guide members 72, 73 are spaced apart by a specified distance 75 so as to tightly hold a cylindrical element 85 (described later) of the driving unit 80 in cooperation. Further, the guide member 73 is biased toward the guide member 72 by a spring 74.

The driving unit 80 includes a frame 81, support members 82, 83 integrally formed on the frame 81, a drive shaft (driving member) 84, the cylindrical element (driving member) 85 and a piezoelectric element 5. The drive shaft 84 and the cylindrical element 85 are so constructed as to have a smaller mass than the frame 81. The piezoelectric element 5 has one end thereof adhered to the drive shaft 84 while having the other end thereof adhered to one side wall of the frame 81.

The drive shaft 84 is supported movably along its longitudinal direction by the support member 82, and has the cylindrical element 85 integrally secured to its middle, so that the drive shaft 84 and the cylindrical element 85 reciprocate along the longitudinal direction by the expansion and contraction of the piezoelectric element 5 along its thickness direction. Further, the frame 81 is formed with a mount hole 81a for fixing an unillustrated driven member.

The frame 81 and the support members 82, 83 of the driving unit 80 are not in contact with the base 71 and the guide members 72, 73, and only the cylindrical element 85 is in contact with the guide members 72, 73. Thus, the driving unit 80 is held while being vertically spaced apart from the base 71 as shown in FIG. 11.

In this way, the cylindrical element 85 is tightly held between the guide members 72, 73 and the drive shaft 84 secured to the cylindrical element 85 is coupled, via the cylindrical element 85, with the guide members 72, 73 by a specified friction force produced by a biasing force of the spring 74.

Next, the operation of this embodiment is described. When a drive pulse signal as shown in FIG. 3 is applied to the piezoelectric element 5, the piezoelectric element 5 rapidly contracts during the rapid rise of the drive pulse signal. However, an inertial force of the frame 81 to remain in its position exceeds a frictional coupling force acting between the cylindrical element 85 and the guide members 72, 73, thereby causing skidding between the cylindrical element 85 and the guide members 72, 73. Accordingly, the frame 81 remains in its initial position without moving.

Subsequently, the piezoelectric element 5 slowly expands during the slow fall of the drive pulse signal. The cylindrical element 85 is not moved with respect to the guide members 72, 73 due to the frictional coupling force acting between it and the guide members 72, 73. Accordingly, the frame 81 is moved in the direction of arrow shown in FIG. 10.

By repeating the above, the driven member secured to the frame 81 is moved in the direction of arrow. Further, the frame 81 can be moved in a direction opposite from the direction of arrow by applying to the piezoelectric element 5 such a drive pulse as to rapidly fall and slowly rise. In this way, the actuator driving device 60 of this embodiment constructs a motor-driven linear actuator.

Figure 12:
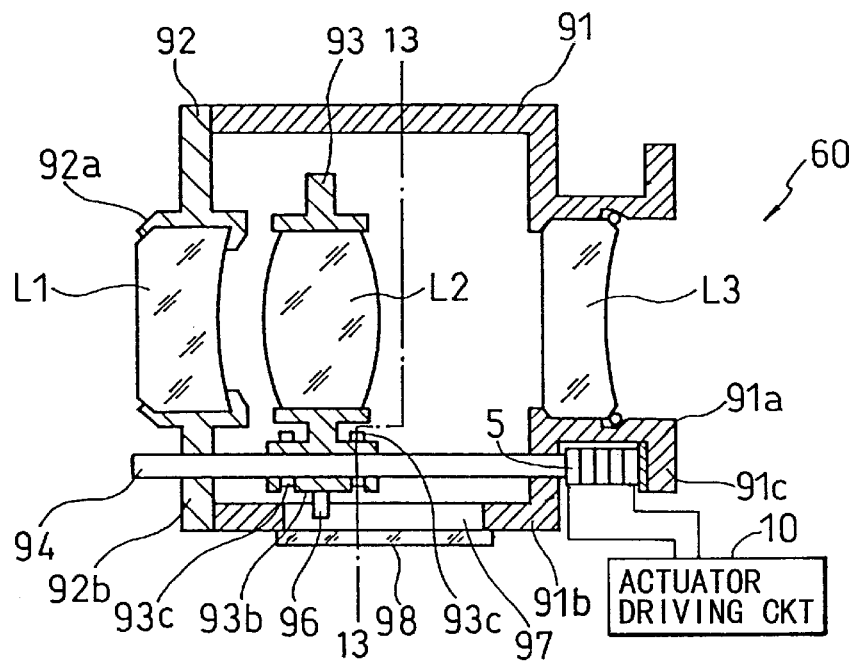
FIG. 12 is a section taken along an optical axis of a lens.

(5) An embodiment in which the driven member driven by the actuator driving device 60 is a lens is described. FIG. 12 is a section along an optical axis of a lens, and FIG. 13 is a section taken along the line 13—13 of FIG. 12.

A holding frame 92 for a first lens L1 is secured to the left end of a lens barrel 91, and a holding frame for a third lens L3 is formed at a right end 91a of the lens barrel 91. Inside the lens barrel 91 is movably arranged a holding frame (friction member) 93 for a second lens L2 along the optical axis.

Figure 13:
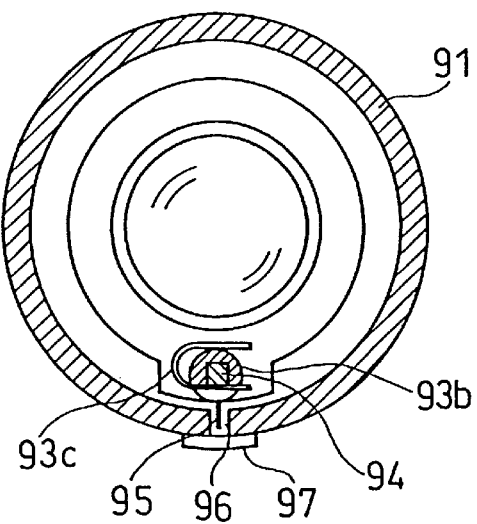
FIG. 13 is a section taken along the line 13—13 shown in FIG. 12.
Figure 14:
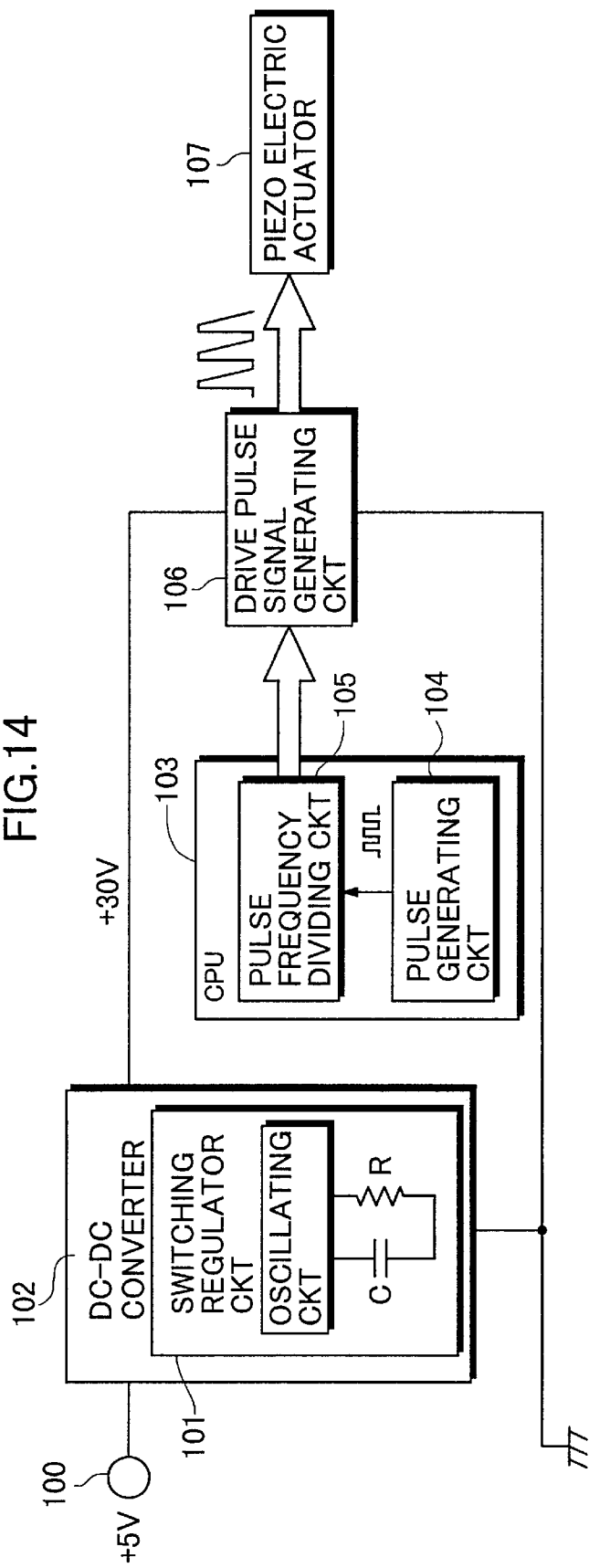
FIG. 14 is a block diagram showing a conventional driving circuit for a piezoelectric actuator.

A drive shaft (driving member) 94 is adapted to drive the holding frame 93 for the second lens L2 along the optical axis; has a square cross section as shown in FIG. 13; and is movably supported by a first flange 91b of the lens barrel 91 and a flange 92b of the holding frame 92 along the optical axis. The piezoelectric element 5 is displaced along its thickness direction to displace the drive shaft 9 along its longitudinal direction, and has one end thereof adhered to the drive shaft 94 while having the other end thereof adhered to a second flange 91c of the lens barrel 91.

The holding frame 93 for the second lens L2 is provided with a contact member 93b extending downward. The drive shaft 94 penetrates through the contact member 93b, which is formed with a recess in its bottom surface. The contact member 93b and the drive shaft 94 are pressed in contact with each other by a U-shaped spring 93c fitted between the recess and the upper surface of the contact member 93b as shown in FIG. 13 and, accordingly, coupled with a specified frictional force.

An index 95 is fixedly attached to the holding frame 93 and is observable from the outside through a slit 96 formed in the lens barrel 91. The index 95 indicates the position of the second lens L2 with respect to the lens barrel 91, this position corresponding to an object distance when the lens is focused to an object. A cover 97 made of a transparent material is fitted in the slit 96 of the lens barrel 91.

In the above construction, a drive pulse signal is sent from an actuator driving circuit 10 to the piezoelectric element 5 based on a focus detection information for an object which is outputted from an unillustrated focus detecting circuit. Focusing is performed by moving the holding frame 93 coupled with the drive shaft 94 by friction substantially in the same manner as in the foregoing embodiments.

(6) Although the actuator is a piezoelectric actuator for moving the movable member by its expansion and contraction in the foregoing embodiments, it is not limited thereto.

For example, the actuator may be an ultrasonic motor for rotating a rotor by the expansion and contraction of a piezoelectric element or an acceleration sensor for detecting a vibration applied to a piezoelectric element.

As described above, there are provided an drive pulse signal generator for supplying a drive pulse signal of a specified ultrasonic frequency to the actuator and a drive voltage generator for supplying the drive voltage used to generate the drive pulse signal to the drive pulse signal generator upon the receipt of a power supplied from the power source. Since the relationship between the frequency of power noise cyclically produced from the drive voltage generator and imposed on the drive voltage and the frequency of the drive pulse signal is so set as to satisfy the following equation, sounds of howling produced by the power noise and harmonics of the drive pulse signal having a specified order or lower orders can be made hard to hear by humans. Therefore, an unpleasant feeling resulting from the driving of the actuator can be prevented.

$$4000 < |m \cdot f1 - n \cdot f2|$$

where m: positive integer below a specified value n: positive integer below a specified value f1: frequency of power noise f2: frequency of the drive pulse signal.

By setting the frequency of the power noise and that of the drive pulse signal so as to satisfy the following equation, the power noise and the drive pulse signal are synchronized, with the result that the drive voltage and the drive pulse signal can be generated by a simple construction. Further, since the frequency of the generated howling is a multiple of f1/k, the howling can be made hard to hear by setting 4000<(f1/k). In this way, unpleasant feeling caused by driving the actuator can be prevented.

$$f1/k = f2/j$$

$$4000 < (f1/k)$$

where j: specified positive integer, k: specified positive integer mutually prime to j f1: frequency of the power noise f2: frequency of the drive pulse signal.

The drive voltage generator includes the switching power supply circuit provided with a switching element and a switching element driver for turning the switching element on and off at a specified frequency. Assuming that the power noise is generated at the above frequency by turning the switching element on and off, the power noise is generated at the on-off frequency of the switching element. By setting the frequency of the power noise and that of the drive pulse signal so as to satisfy the above relationship, howling generated by the power noise and harmonics of a specified order or lower of the drive pulse signal can be made hardly audible to humans. As a result, unpleasant feeling caused by driving the actuator can be prevented.

The pulse signal generator for generating a pulse signal of a specified frequency is also provided, and the drive pulse signal generator generates the drive pulse signal by frequency-dividing this pulse signal. The switching element driver turns the switching element on and off in synchronism with the signal obtained by frequency-dividing the pulse signal. Accordingly, the frequency of the drive pulse signal and the on-off frequency of the switching element can be accurately and easily set.

The actuator includes an electromechanical transducing element which expands and contacts by the application of a voltage. By constructing the drive pulse signal generator to apply a pulse voltage as the drive pulse signal to the electromechanical transducing element, howling, which occurs due to the expansion and contraction of the electromechanical transducing element in response to the drive pulse signal and due to the power noise, can be made hardly audible to humans. Therefore, unpleasant feeling caused by driving the actuator can be prevented.

By constructing the actuator from an ultrasonic motor including the above electromechanical transducing element, howling, which occurs due to the expansion and contraction of the electromechanical transducing element in response to the drive pulse signal and due to the power noise, can be made hardly audible to humans. Therefore, unpleasant feeling caused by driving the actuator can be prevented.

By constructing the actuator to move along an optical axis of a lens arranged in a camera so as to focus the lens, howling, which occurs by the driving of the actuator in response to the drive pulse signal and the fine driving of the actuator caused by the power noise when the actuator is driven upon the receipt of the drive pulse signal to move the lens along the optical axis for focusing, can be made hardly audible to humans. Therefore, unpleasant feeling caused by driving the actuator can be prevented.

The actuator driving circuit may be provided with the drive member secured to one end of the electromechanical transducing element in its expanding and contracting directions and the friction member coupled with the driving member by friction. By causing the pulse voltage the drive pulse signal generator applies to the electromechanical transducing element to have a section where its voltage level rapidly changes and a section where its voltage level slowly changes in a direction opposite from the direction of the rapid change, howling generated by the power noise and harmonics of a specified order or lower of the drive pulse signal can be made hardly audible to humans. As a result, unpleasant feeling caused by driving the electromechanical transducing element can be prevented.

By securing the friction member to the lens and arranging the electromechanical transducing element such that its expanding and contracting directions are parallel to the optical axis of the lens, there can be similarly realized a device capable of preventing unpleasant feeling caused by driving the lens.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within meets and bounds of the claims, or equivalence of such meets and bounds are therefore intended to embraced by the claims.

What is claimed is:

1. An actuator driving circuit comprising:

a drive pulse signal generator which generates a drive pulse signal having a specified ultrasonic frequency, and supplies it to drive an actuator; and a drive voltage generator which generates a drive voltage for drive pulse signal generation upon receipt of a power supplied from a power source, and supplies it to the drive pulse signal generator;

the relationship between the frequency of power noise cyclically produced from the drive voltage generator and imposed on the drive voltage and the frequency of the drive pulse signal being so set as to satisfy the following equation:

$$4000 < |m \cdot f1 - n \cdot f2|$$

wherein
- m: positive integer below a specified value;
- n: positive integer below a specified value;
- f1: frequency of power noise; and
- f2: frequency of the drive pulse signal.

2. An actuator driving circuit according to claim 1, wherein the relationship between the frequency of the power noise and that of the drive pulse signal is so set as to satisfy the following equation:

$$f1/k = f2/j$$

$$4000 < (f1/k)$$

wherein
- j: specified positive integer;
- k: specified positive integer mutually prime to j;
- f1: frequency of the power noise; and
- f2: frequency of the drive pulse signal.

3. An actuator driving circuit according to claim 1, wherein the drive voltage generator includes a switching power supply circuit provided with:
- a switching element; and
- a switching element driver which turns the switching element on and off at a specified frequency; and
- the frequency of the power noise corresponds to the on-off frequency of the switching element.

4. An actuator driving circuit according to claim 3, further comprising a primary pulse signal generator which generates a primary pulse signal having a specified frequency, and a frequency divider which divides the primary pulse signal into a first pulse signal having a first divided frequency and a second pulse signal having a second divided frequency, wherein:
- the drive pulse signal generator generates the drive pulse signal in accordance with the first pulse signal; and
- the switching element driver turns the switching element on and off in synchronism with the second pulse signal.

5. An actuator driving circuit according to claim 1, wherein the actuator includes an electromechanical transducing element expandable and contractible in accordance with application of a voltage, and the drive pulse signal generator applies the drive pulse signal to the electromechanical transducing element.

6. An actuator driving circuit according to claim 1, wherein the actuator is operable to move a lens arranged in a camera along an optical axis of the lens.

7. An actuator driving circuit comprising:
- a drive pulse signal generator which generates a drive pulse signal having a specified ultrasonic frequency, and supplies it to a ultrasonic motor having an electromechanical transducing element expandable and contractible in accordance with the drive pulse signal; and
- a drive voltage generator which generates a drive voltage for drive pulse signal generation upon receipt of a power supplied from a power source, and supplies it to the drive pulse signal generator;
- the relationship between the frequency of power noise cyclically produced from the drive voltage generator and imposed on the drive voltage and the frequency of the drive pulse signal being so set as to satisfy the following equation:

$$4000 < |m \cdot f1 - n \cdot f2|$$

wherein
- m: positive integer below a specified value;
- n: positive integer below a specified value;
- f1: frequency of power noise; and
- f2: frequency of the drive pulse signal.

8. An actuator driving device comprising:
- a driving circuit including:
  - a drive pulse signal generator which generates a drive pulse signal having a specified ultrasonic frequency, and supplies it to an actuator having an electromechanical transducing element expandable and contractible in accordance with the drive pulse signal, the drive pulse signal having a first section where its voltage level rapidly changes and a second section where its voltage level slowly changes in a direction opposite from the direction of rapid change; and
  - a drive voltage generator which generates a drive voltage for drive pulse signal generation upon receipt of a power supplied from a power source, and supplies it to the drive pulse signal generator;
- the relationship between the frequency of power noise cyclically produced from the drive voltage generator and imposed on the drive voltage and the frequency of the drive pulse signal being so set as to satisfy the following equation:

$$4000 < |m \cdot f1 - n \cdot f2|$$

wherein
- m: positive integer below a specified value;
- n: positive integer below a specified value;
- f1: frequency of power noise; and
- f2: frequency of the drive pulse signal.
- a drive member secured to one end of the electromechanical transducing element in its expanding and contracting directions; and
- a friction member frictionally coupled with the driving member.

9. An actuator driving device according to claim 8, wherein the actuator is operable to drive a lens arranged in a camera, and the friction member is fixedly attached to the lens, and the electromechanical transducing element is arranged parallel with an optical axis of the lens.

10. An actuator driving device according to claim 8, wherein the relationship between the frequency of the power noise and that of the drive pulse signal is so set as to satisfy the following equation:

$$f1/k = f2/j$$

$$4000 < (f1/k)$$

wherein
- j: specified positive integer;
- k: specified positive integer mutually prime to j;
- f1: frequency of the power noise; and
- f2: frequency of the drive pulse signal.

11. An actuator driving device according to claim 8, wherein the drive voltage generator includes a switching power supply circuit provided with:
- a switching element; and
- a switching element driver which turns the switching element on and off at a specified frequency; and the frequency of the power noise corresponds to the on-off frequency of the switching element.

12. An actuator driving device according to claim 11, wherein the actuator driving circuit further includes a primary pulse signal generator which generates a primary pulse signal having a specified frequency, and a frequency divider which divides the primary pulse signal into a first pulse signal having a first divided frequency and a second pulse signal having a second divided frequency, wherein:

the drive pulse signal generator generates the drive pulse signal in accordance with the first pulse signal; and the switching element driver turns the switching element on and off in synchronism with the second pulse signal.

13. An actuator driving device according to claim 8, wherein the actuator is a ultrasonic motor.

14. A method for driving an actuator, comprising the steps of:

generating a drive voltage upon receipt of a power supplied from a power source;

generating a drive pulse signal upon receipt of the generated drive voltage, the drive pulse signal being generated at a frequency (f2) satisfying the following equation:

$$4000 < |m \cdot f1 - n \cdot f2|$$

wherein m: positive integer below a specified value;

n: positive integer below a specified value; and f1: frequency of power noise cyclically produced in the drive voltage generation and imposed on the drive voltage supplying the generated drive pulse signal to an actuator.

15. A method according to claim 14, wherein the relationship between the frequency of the power noise and that of the drive pulse signal is so set as to satisfy the following equation:

$$f1/k = f2/j$$

$$4000 < (f1/k)$$

wherein j: specified positive integer;

k: specified positive integer mutually prime to j;

f1: frequency of the power noise; and f2: frequency of the drive pulse signal.

* * * * *